Dec. 22, 1936.  F. NALLINGER  2,065,148
COOLING APPARATUS OPERATING WITH THERMOSTATS
Filed April 11, 1934
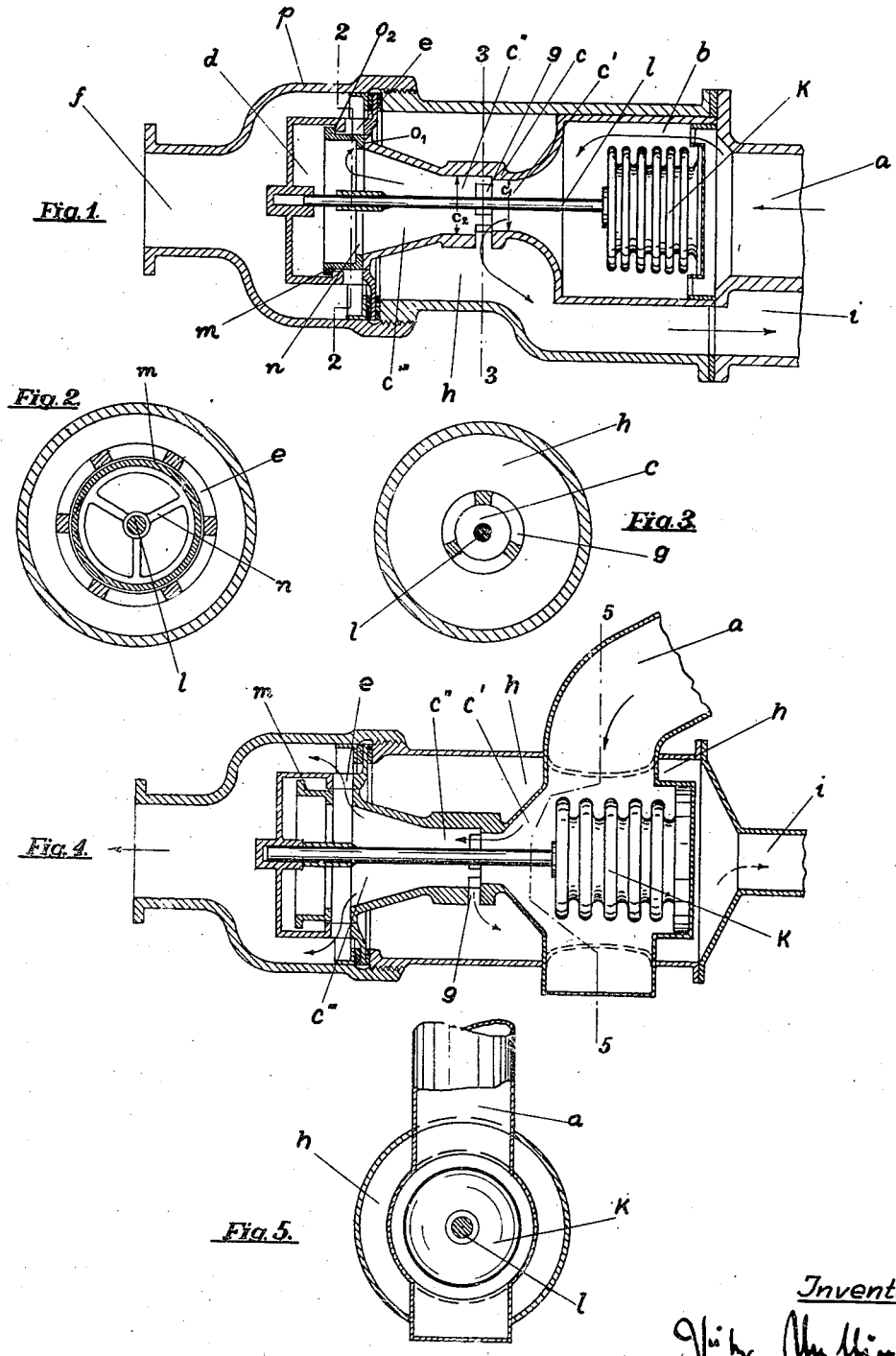
Inventor Patented Dec. 22, 1936

2,065,148

UNITED STATES PATENT OFFICE 2,065,148

COOLING APPARATUS OPERATING WITH THERMOSTATS

Fritz Nallinger, Stuttgart, Germany, assignor to Daimler Benz Aktiengesellschaft, Stuttgart-Unterturkheim, Germany Application April 11, 1934, Serial No. 720,104
In Germany March 18, 1933

6 Claims. (Cl. 236—34)

This invention relates to a regulating device for a cooling arrangement, controlled by a thermostat which influences a valve disposed in the main flow. The by-pass is branched off between the thermostat body and the valve. According to the invention the connection between the thermostat body and the valve is constructed substantially in the manner of a Venturi nozzle, at the narrowest place of which the permanently open by-pass is branched off. The special advantage of the arrangement of the Venturi nozzle between the thermostat and the member for closing the connection leading to the cooler is that a separate closing member for the by-pass is not required. The construction thus has not only the advantage of extreme simplicity, but also eliminates any possibility of a disturbance. At the same time there results a very suitable arrangement of the thermostat which is disposed in front of the control members in the stream of the inflowing cooling water and is therefore immediately influenced by every variation in the temperature of the cooling water. At the branching off place of the by-pass the internal diameter of the Venturi nozzle increases suddenly by a slight amount, so as to assist the ejector action exerted by the by-pass.

The known cooling water regulating devices with a thermostat mostly have the further disadvantage that they are more or less subject to the liquid pressure, more particularly for instance when the vehicle is travelling downhill, when the engine, although running idle or completely shut off, may run at high speeds of revolution. In this operative state there are relatively high velocities of flow and high cooling water pressures in the cooling water regulating device. With the usual disc valves there are considerable damming pressures in such a cooling water stream, which may result for instance in a premature or too wide opening of the valve.

For obviating this disadvantage, according to the invention the valve member is made in the form of a ring-shaped body, and so disposed that the motion of the valve member is not substantially influenced by the liquid pressure, more particularly not so as to cause additional opening. Experiments with such regulating devices have shown that, instead of there being a temperature drop from 70° to about 50°, such as have sometimes been observed with the usual devices, more particularly when travelling long distances downhill in the winter, the desired temperature could be maintained with variations of at most 2°. The most suitable form for a control member serving this purpose is, according to the invention, a double-seated ring valve, the valve seat surfaces of which lie outside the for instance central inflow of the liquid.

In the accompanying drawing two constructional examples are illustrated in Figs. 1 to 3 and Figs. 4 and 5 respectively, Fig. 2 being a section on line E—F, Fig. 3 a section on line A—B of Fig. 1, and Fig. 5 a section on line C—D of Fig. 4.

$a$ is the cooling water intake coming for instance from the engine, which opens into a space $b$. The latter merges into a constricted part in the nature of a Venturi nozzle $c$ ($c'$, $c''$, $c'''$), the flaring part $c'''$ of which leads to a space $d$ and thence by way of a ring-shaped gap or circularly disposed openings $e$ to the cooling water outlet $f$ leading for instance to the radiator. At the narrowest part of the Venturi nozzle are openings $g$ which lead from the interior of the nozzle into an outer space $h$ and to the by-pass $i$. In the space $b$ there is disposed a thermostat body $k$ which, on the temperature of the cooling water rising, expands in a known manner and the expansion movement of which is transmitted by way of a valve stem $l$ to a ring valve $m$. The latter is connected by means of small bridging pieces $n$ to a hub fixed on the valve stem and rests on the one hand with one seating surface $o_1$ on the nozzle body and on the other hand with a second valve seating surface $o_2$ on a cap $p$ which is fixed to the nozzle body or to the thermostat wall and closes the space $d$. The cap also acts as a guide for the valve stem and is interrupted at its periphery by the aforementioned openings $e$.

The manner in which the thermostat operates is obvious from the above. The cooling water enters at $a$, sweeps around the sides of the thermostat $k$ and passes through the constriction $c$ into the space $d$. Any considerable influencing of the motion of the ring valve $m$ by the liquid pressure is prevented through the cooling water first passing through the openings formed between the bridging pieces $n$ of the valve, so that it cannot exert on the valve a pressure tending to open it.

If at low cooling water temperatures the valve $m$ is closed, as shown in Fig. 1, the cooling water entering the space $d$ accumulates, without being able to pass into the cooling water outlet through the ports $e$, and causes the cooling water flowing after it to flow through the openings $g$ into the space $h$ and from there into the by-pass $i$. On the valve $m$ opening, however, when the cooling water temperature rises, the cooling water passing out of the nozzle c into the space d can flow, through the ports e into the cooling water outlet f. According to the amount by which the valve opens a stronger or weaker flow through the valve gap will result. At the narrowest place c'' of the Venturi nozzle c a correspondingly increasing partial vacuum bearing a relation to the usual pipe pressure will result, which more or less effectively prevents the cooling water flowing out of the space b through the nozzle from passing through the openings g into the by-pass. The dimensions may be such that, when the valve is quite open, there will be no flow at all of cooling water into the by-pass. For assisting the ejector-like effect of the Venturi nozzle on the by-pass a sudden, even if slight, increase in the nozzle diameter may be provided, where the openings g are located, the cross-sectional area of the nozzle in front of the openings g having for instance a diameter $c_1$, and behind the openings g a slightly greater diameter $c_2$.

The constructional form shown in Fig. 4 corresponds substantially to that according to Fig. 1, but in this case instead of a central cooling water inlet there is a lateral inlet a, while the by-pass i is arranged in the axis of the thermostat. In this figure the valve m is shown in the open position.

Such thermostats may of course be used for other purposes than for internal combustion engines, for instance for hot water pipe lines, steam pipe lines and the like and also for systems operating without special by-passes.

What I claim is:

1. A regulating device for controlling the flow of heated liquid in dependence on the temperature, comprising a main flow conduit, a valve member for controlling the flow of liquid through said main flow conduit, a thermostat operatively connected to said valve member and located in the main flow conduit so as to actuate the valve member in accordance with variations in the temperature of the liquid flowing through the main flow conduit, a closing wall for said main flow conduit perpendicular to the inflowing stream of liquid, said valve member and main low conduit having co-operating double seatings and the main flow conduit having a ring-shaped outlet in proximity to one of the seatings of the conduit so disposed that the liquid pressure will not tend to open the valve, said main flow conduit having a constriction therein between the valve member and the thermostat, and a by-pass connected to the main flow conduit in the region of the constriction, so that when the valve member is open substantially no liquid passes from the main flow conduit to the by-pass.

2. In a cooling water circulating system for an internal combustion engine having a radiator, the combination of a conduit for conveying cooling water from the engine, of flow regulating means comprising a housing having an outer part with a by-pass outlet therein and an inner part connected to said conduit and having a constriction therein in open communication with the outer part and the by-pass outlet, a thermostat on the upstream side of the constriction, said inner part having an outlet for the main flow of the cooling water and a valve operatively connected to the thermostat for controlling the flow through the inner part in accordance with the temperature.

3. In a cooling water circulating system for an internal combustion engine having a radiator, the combination of a conduit for conveying cooling water from the engine, of flow regulating means comprising a housing having an outer part with a by-pass outlet therein and an inner part connected to said conduit and having a constriction therein in open communication with the outer part and the by-pass outlet, a thermostat on the upstream side of the constriction, said inner part having radial outlet slots therein for the main flow of the cooling water and a tubular slide valve operatively connected to the thermostat and arranged to control the flow of cooling water through said slots in accordance with the temperature.

4. A regulating device for controlling the flow of heated liquid in dependence on the temperature, comprising a main flow conduit having a constriction therein, a valve member on the downstream side of the constriction for controlling the flow of liquid through the main flow conduit and a thermostat located in the main flow conduit on the upstream side of the constriction so as to be exposed to the full stream of the liquid, said thermostat operatively connected to the said valve member so as to actuate the valve member in accordance with the variations in the temperature of the liquid flowing through the main flow conduit, said constriction having a by-pass outlet therein through which liquid can escape from the main flow conduit only when the passage of liquid through the main flow conduit is impeded by the valve member.

5. In a cooling water circulating system for an internal combustion engine having a radiator, a main flow conduit for connecting the engine to the radiator, said main flow conduit having a constriction therein, a valve member on the downstream side of the constriction for controlling the flow of cooling water through the main flow conduit, a thermostat located in the main flow conduit on the upstream side of the constriction so as to be exposed to the full stream of the cooling water, said thermostat operatively connected to the valve member so as to actuate the valve member in accordance with the variations in the temperature of the cooling water flowing through the main flow conduit, said constriction having a by-pass outlet therein through which cooling water can escape from the main flow conduit only when the passage of cooling water through the main flow conduit is impeded by the valve member, and a conduit for connecting the by-pass outlet to the engine for returning the cooling water directly to the engine when the valve member is closed.

6. A regulating device for controlling the flow of heated liquid in dependence on the temperature as set forth in claim 4, in which the constriction comprises a Venturi nozzle.

FRITZ NALLINGER.